United States Patent [19]

Varlev

[11] 4,009,830
[45] Mar. 1, 1977

[54] HYDRANT CONSTRUCTION FOR A SOIL IRRIGATION SYSTEM

[75] Inventor: Ivan Stefanov Varlev, Sofia, Bulgaria

[73] Assignee: Centralna Laboratoria Za Agrophysicheski Izsledvania, Sofia, Bulgaria

[22] Filed: Apr. 21, 1976

[21] Appl. No.: 678,763

[30] Foreign Application Priority Data

Apr. 24, 1975 Bulgaria ................................. 29806

[52] U.S. Cl. ............................... 239/204; 239/288; 239/457; 239/581
[51] Int. Cl.² .................. B05B 15/10; B05B 15/04; B05B 1/30
[58] Field of Search .......... 239/107, 200, 201, 203, 239/204, 205, 257, 288, 288.3, 288.5, 451, 456, 457, 458, 537–540, 581, DIG. 1

[56] References Cited

UNITED STATES PATENTS

| | | | |
|---|---|---|---|
| 1,201,990 | 10/1916 | Thomas | 239/457 X |
| 1,906,621 | 5/1933 | Knuth | 239/204 |
| 2,935,266 | 5/1960 | Coleondro et al. | 239/204 X |
| 2,990,120 | 6/1961 | Reynolds | 239 204 X/ |
| 3,454,225 | 7/1969 | Hunter | 239/205 |

Primary Examiner—Evon C. Blunk
Assistant Examiner—Andres Kashnikow

[57] ABSTRACT

A soil-mounted hydrant selectively positionable above the ground level to distribute an irrigation fluid to its environment is described. A distributing aperture in the side wall on the upper portion of a cylindrical hydrant housing is closable to a desired degree by a hollow cylindrical cap member that is threadable into the interior of the hydrant housing. The threaded cap is captured within the interior of the housing by means of a limit pin disposed above the distributing aperture, such pin contacting the aperture-blocking portion of the cap when such cap is threaded outwardly to an upper limit, in which position the aperture is fully exposed. A longitudinal bore extends completely through the cap for shunting a portion of the irrigation fluid in an upwardly directed path while the hydrant is below ground level, such bore terminating in a nozzle for saturating the surrounding soil with a fine jet-like spray to facilitate the upward movement of the hydrant out of the ground. The upper end of the cap is upwardly and inwardly tapered to further facilitate the removal of the hydrant from the ground.

8 Claims, 3 Drawing Figures

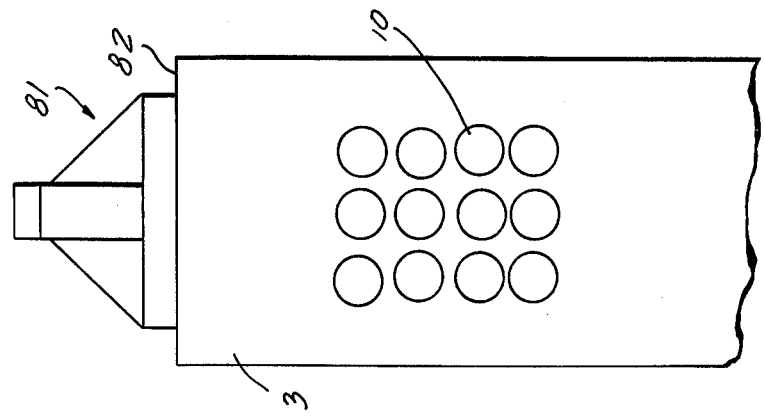
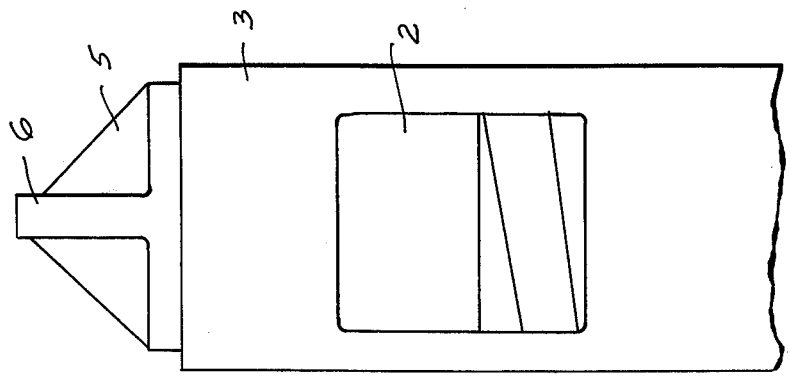
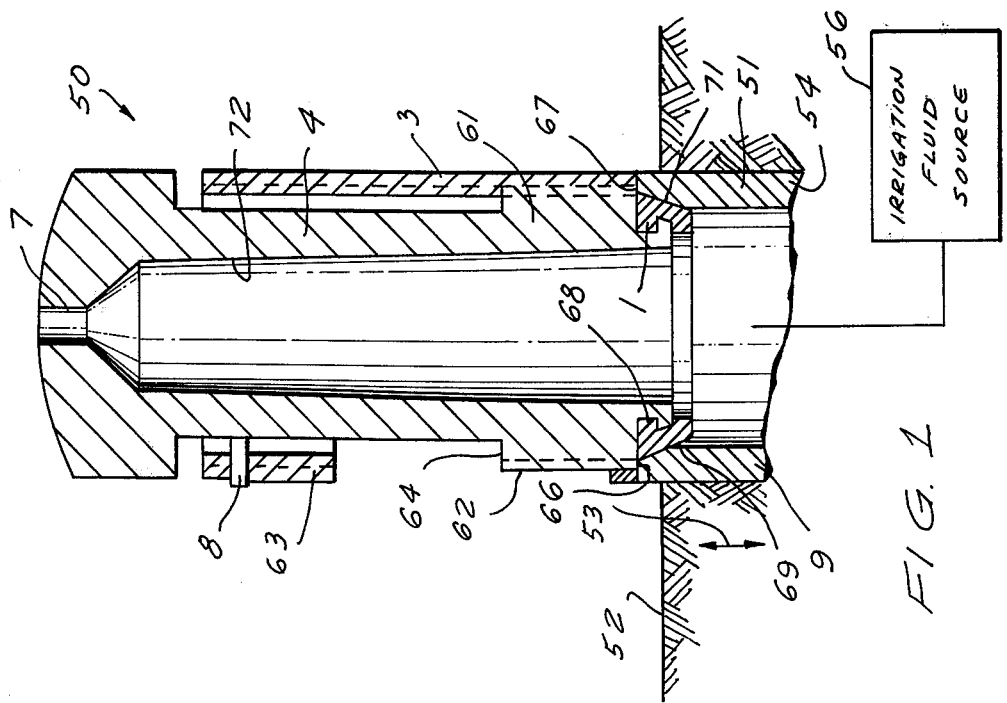

HYDRANT CONSTRUCTION FOR A SOIL IRRIGATION SYSTEM

BACKGROUND OF THE INVENTION

The invention relates to submersible hydrants for soil irrigation systems, and more particularly to submersible hydrants adapted to receive a movable cap member which cooperates with the hydrant housing for selectively blocking, during submergence of the hydrant, an aperture disposed in the side wall of the hydrant housing for distributing the irrigation fluid.

In known arrangements of this type, the hydrant housing is connectable at its lower end with a source of irrigation fluid, and the hydrant is movable between a lower position in which the liquid-distributing aperture is below ground level and an upper position in which the distributing aperture is above ground level. During periods when the hydrant is to be submerged, a removable protective cap is inserted into the upper portion of the hydrant housing, with the external periphery of the cap serving to close the distributing aperture to prevent dirt from entering the interior of the hydrant and thereby contaminating the irrigation fluid source.

During periods when the hydrant is raised into its operative position above ground, it is customary to remove the blocking cap member, and to position a conventional fluid-distributing conduit (either flexible or rigid) over the distributing aperture. Since in the course of a growing season, and at other times, it is necessary to raise and submerge each hydrant in the system a plurality of times, an inordinate expenditure of time and labor is generally involved in the repeated connecting and disconnecting of the protective cap and the distributing conduits from the hydrant.

SUMMARY OF THE INVENTION

Such disadvantages are overcome with the arrangement in accordance with the invention, in which a cap member is captured within the upper portion of the hydrant housing for cooperation therewith even when the hydrant is in its operative, above-ground position. In an illustrative embodiment, the cap member and the surrounding housing are suitably threaded to permit adjustable positioning of the cap member in the upper housing portion at a desired position between upper and lower limits at which the distributing aperture is completely open and closed, respectively. The capturing means may include a limit pin which projects inwardly from the side wall of the upper housing portion above the distributing aperture, such pin serving to inhibit further upward movement of the cap after the distributing aperture is completely exposed.

In order to provide an effective fluid-tight, contamination-proof seal between the cap and the interior of the hydrant housing when the hydrant is in its submerged position (i.e., when the cap is against its lower limit completely blocking the distributing aperture), the housing is provided with an inwardly tapering shoulder that cooperates with a seal of complementary shape carried on the lower end of the cap.

In order to facilitate the emergence of the hydrant housing and the captured cap from the earth into the operative position of the hydrant, the upper portion of the cap is tapered inwardly and upwardly to define a soil-displacing wedge. Additionally, the cap may be provided with a bore extending longitudinally therethrough and terminating at its upper end in a nozzle to propel a jet-type spray upwardly from the hydrant, thereby wetting and softening the surrounding soil.

The distributing aperture may take the form of a single, relatively large opening. Alternatively, the distributing aperture may include a plurality of relatively small openings disposed in spaced relation to each other, each of the openings being chosen of a size that is substantially impermeable to particles of the soil surrounding the housing when such housing is in its submerged position.

BRIEF DESCRIPTION OF THE DRAWING

The invention is further set forth in the following detailed description taken in conjunction with the appended drawing, in which:

FIG. 1 is a longitudinal section of a submersible hydrant having a housing-cap assembly constructed in accordance with the invention;

FIG. 2 is an external longitudinal view of the housing of FIG. 1, illustrating a first aperture design in the side wall of the hydrant housing for distributing irrigating liquid, and FIG. 3 is an external longitudinal view, similar to FIG. 2, illustrating a second type of aperture arrangement disposed in the side wall of the hydrant housing for distributing the irrigating liquid.

DETAILED DESCRIPTION

Referring now to the drawing, the numeral 50 represents a typical hydrant constructed in accordance with the invention for use in a soil irrigation system. The hydrant 50 includes a cylindrical jacket or casing 51, such casing being normally submerged in a conventional manner within a soil bank represented at 52, and movable upwardly therefrom in the direction of an arrow 53 to the above-ground position illustrated in FIG. 1.

The casing 51 includes a lower portion 54 which, in a conventional manner, is in communication with a suitable source 56 of an irrigation fluid. The casing 51 terminates in its upper end in a relatively thin sleeve 3, which may be integral with the lower portion 54 or affixed thereto by means of welding or the like.

An irrigation fluid-distributing aperture 2 is disposed in the side wall of the sleeve portion 3 of the hydrant. The aperture 2, which may take the form of a single large opening illustrated in FIG. 2, has the function of distributing, to the surrounding soil 52, irrigation fluid introduced into the interior of the casing 51 from the source 56 when the hydrant 50 is in its depicted above-ground position.

In order to prevent dirt from the surrounding soil bank from entering the interior of the casing 51 to contaminate the source 56 when the hydrant is in its below-ground position, the distribution opening 2 may be selectively blocked by means of a cap member 4 which is inserted coaxially into the interior of the sleeve 3.

In previous designs of this general type, the dirt-blocking cap is inserted each time the hydrant 50 is moved into its below-ground position, and is removed from the hydrant whenever the hydrant is moved into its above-ground position. The necessity of the successive insertions and removal of the cap has been extremely wasteful of time and labor, particularly when a large plurality of hydrants of the type illustrated in FIG. 1 are associated with a single soil irrigation system.

In accordance with the invention, the cap 4 is constructed to cooperate with the hydrant casing 51 in such a manner as to avoid all these disadvantages. In particular, a lower portion 61 of the cap member 4 is provided with a threaded portion 62 which cooperates with a mating thread 63 on the inner surface of the sleeve 3 so that the cap member 4 can be threaded into the sleeve 3 to an adjustable position between a lower limit in which the distributing aperture 2 is completely blocked, as depicted in FIG. 1, and an upper limit wherein an external shoulder 64 on the cap member 4 abuts a limit pin 8 which extends radially inwardly from the side wall of the sleeve 3 above the aperture 2. The cap member 4 is thereby captured within the hydrant housing 51.

A second external shoulder 66 on the cap member 4 is adapted to engage an abutment surface 67 on the hydrant housing 51 at the interface of the sleeve 3 and the lower portion 54 when the cap member 4 is threaded into its lower limit. In order to provide a contamination-proof seal between the cap member 4 and the housing 51 during the time that the hydrant 50 is disposed within the soil bank 52, the lower end of the cap member 4 has a slot-shaped radial recess 68 which receives an upper portion of a U-shaped resilient seal 1. The seal 1 has a substantially frusto-conical outer surface 69 which is complementary to an inwardly tapering shoulder 71 at the top of the lower hydrant portion 54, whereby when the cap member 4 is in its lowermost position against the abutment surface 67, the surfaces 69 and 71 are in sealing contact.

Because of the adjustable positioning of the cap member 4 between its upper and lower limits, the distribution aperture 2 can be effectively opened to a desired degree, thereby serving as a regulator for the volume and rate of flow of irrigation fluid from the source 56 to the surrounding soil 52 when the hydrant 50 is in its above-ground position.

The cap member 4 is further provided with a central bore 72 extending longitudinally therethrough for communication with the interior of the lower hydrant portion 54 and thereby with the irrigation fluid source 56. The upper portion of the bore 4 tapers inwardly to terminate in a nozzle 7 for converting an upward flow of fluid therethrough into a relatively fine jet-like spray. The purpose of this arrangement is to facilitate the withdrawal of the hydrant 50 from its submerged to its above-ground position, since fluid from the source 56, being blocked from the distributing aperture 2 because of the positioning of the cap member 4 at its lower limit, will be shunted upwardly through the bore 71 and the nozzle 7 to wet and thereby soften the surrounding earth 52.

Preferably the upper end of the cap 4 tapers inwardly and upwardly as indicated by the numeral 5 in FIG. 2, thereby forming a soil-displacing wedge to further facilitate the withdrawal of the hydrant 50 into the above-ground position. For added rigidity, a pair of diametrically opposed transverse ribs 6, 6 may be provided for reinforcing the tapered upper portion 5.

The arrangement of FIG. 3 is similar to that of FIGS. 1 and 2, except that the single, relatively large distribution opening 2 of FIGS. 1–2 is replaced by a plurality of relatively small openings 10, 10 in the side wall of the sleeve 3. A particular advantage of the arrangement of FIG. 3 is that the protection afforded by the side wall of the cap member 4 of FIGS. 1 and 2 can be dispensed with if the size of the openings 10 and FIG. 3 are made smaller than the particles forming the soil bank 52. As a result, a separate member 81 having the form of the tapered cap 5 of the cap member 4 in FIGS. 1 and 2 can be directly seated on a top surface 82 of the sleeve 3 as shown.

In the foregoing, several embodiments of the invention have been described. Many variations and modifications will now occur to those skilled in the art. It is accordingly desired that the scope of the appended claims not be limited to the specific disclosure herein contained.

What is claimed is:

1. For use in a soil irrigation system, a soil-mounted hydrant having a vertically disposed cylindrical housing, the lower end of the housing being communicable with a source of irrigating fluid, an upper portion of the cylinder housing having aperture means disposed in the side wall thereof for externally distributing fluid introduced into the housing from the source, the housing being movable between a lower position in which the aperture means are below ground level and an upper position in which the aperture means are above ground level, and a cap positionable within the upper portion of the housing and cooperable therewith for closing the aperture means, the improvement wherein the hydrant further comprises means supporting the cap for adjustably positioning the cap in the upper portion of the housing at a desired location between the upper limit in which the aperture means are completely open and a lower limit in which the aperture means are completely closed; in which the hydrant further comprises limit means positioned in the upper portion of the cylinder above the aperture means for inhibiting upward movement of the cap when the cap is at the upper limit; and in which the cap is further provided with a central bore extending completely therethrough for selectively conveying a portion of the irrigation fluid upwardly through the cap.

2. A hydrant as defined in claim 1, in which the inner surface of the housing exhibits an inwardly tapering shoulder cooperable with a bottom surface of the cap when the cap is at its lower limit.

3. A hydrant as defined in claim 2, further comprising seal means carried by the lower end of the cap for resilient engagement with the inwardly tapering shoulder on the housing.

4. A hydrant as defined in claim 1, in which the upper end of the cap tapers inwardly and upwardly to define a soil-displacing wedge.

5. A hydrant as defined in claim 1, in which the central bore of the cap exhibits a nozzle at its upper end for distributing the portion of the irrigation fluid in a jet-like spray.

6. A hydrant as defined in claim 1, in which the aperture means comprises a single, relatively large opening disposed in the side wall of the upper portion of the housing.

7. A hydrant as defined in claim 1, in which the aperture means comprises a plurality of relatively small openings disposed in spaced relation in the side wall of the upper portion of the housing.

8. A hydrant as defined in claim 7, in which the size of the individual openings is chosen so that the openings are substantially impermeable to particles of the soil surrounding the housing when the housing is in its lower position.

* * * * *